J. C. WANDS.
VEHICLE-HUB.

No. 173,833.    Patented Feb. 22, 1876.

WITNESSES
Eug. W. Johnson
E. H. Bates

INVENTOR
John. C. Wands,
Chapman Fosmer & Co,
ATTORNEYS

UNITED STATES PATENT OFFICE.

JOHN C. WANDS, OF NASHVILLE, TENNESSEE.

IMPROVEMENT IN VEHICLE-HUBS.

Specification forming part of Letters Patent No. 173,833, dated February 22, 1876; application filed May 28, 1875.

*To all whom it may concern:*

Be it known that I, JOHN C. WANDS, of Nashville, in the county of Davidson and State of Tennessee, have invented a new and valuable Improvement in Metal Wheel-Hubs; and I do hereby declare that the following is a full, clear, and exact description of the construction and operation of the same, reference being had to the annexed drawings, making a part of this specification, and to the letters and figures of reference marked thereon.

Figure 1:
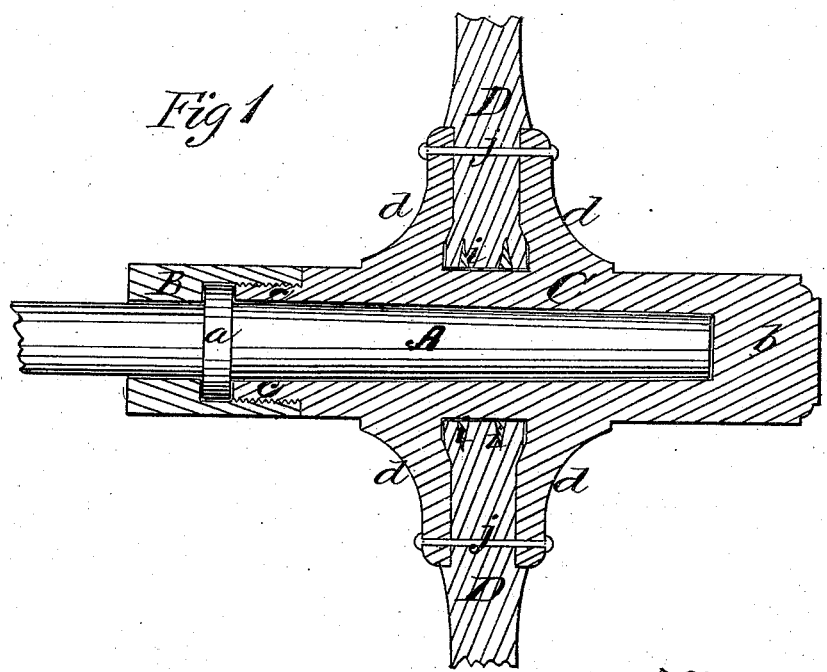
Figure 2:
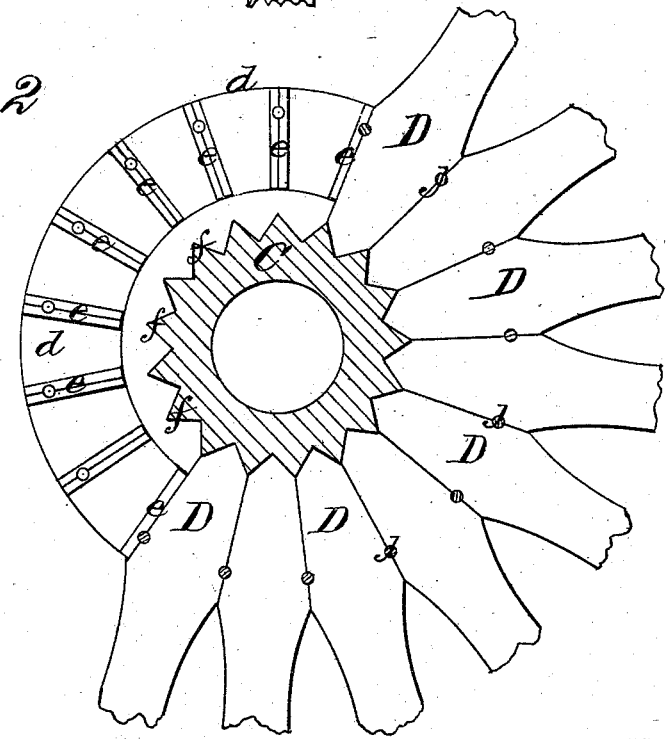

Figure 1 of the drawings is a representation of a longitudinal central section of my hub, and Fig. 2 is a plan view of the same.

This invention has relation to improvements in metallic hubs for vehicle-wheels; and the nature of the invention consists in a hub provided with angular corrugations for the reception of the ends of the spokes, in combination with flanges having radial angular ribs on their inner surfaces, which lie directly opposite each other and in line with the corrugations, as will be hereinafter more fully set forth.

In the annexed drawings, A designates the spindle of an iron axle-tree, having near its inner end a collar or annulus, $a$, cast therewith, upon which is passed, from behind, a female screw-threaded sleeve, B, which fits snugly over that portion of the spindle in rear of collar $a$, the screw-threaded end of which projects beyond the said collar, as shown in Fig. 1. C represents a cast-metal hub, having a cylindrical bore and a closed end, $b$. It has also annular flanges $d$ cast therewith, at a suitable distance apart, between which the ends of spokes D are designed to be secured. The inner end of hub C has a screw-threaded rabbet, $c$, formed thereon, adapted to be received into the open front end of sleeve B, and to be screwed therein by a movement opposite to that which the hub would receive during the progress of the vehicle. The extreme inner end of hub C abuts against collar $a$, the same being thus inclosed between it and sleeve B, so that the hub is effectually secured upon its spindle, and the outer end of the body of the hub being closed, the introduction of sand or mud between the said hub and the spindle is effectually prevented. The bore of hub C is either cast in the original mold and subsequently bored out smooth, or the hub may be cast solid and the bore subsequently made by a suitable cutting-tool, as I may elect. The hub may be made of wrought, cast, or malleable iron, as may be found most desirable. The inner surfaces of flanges $d$ are provided with radial and preferably angular serrations, $e$, which are cast with the hub, and are exactly opposite each other, and the body of the hub between flanges $d$ is longitudinally corrugated, the depressions of the said corrugations $f$ being at the foot of each pair of serrations $e$, as shown in Fig. 2, so that when the spokes, which I designate by the letter D, are driven between serrations $e$, their lower ends, which are of corresponding shape therewith, will be received in the depression between corrugations $f$. In practice, the end of spokes E, designed to be inserted into the mortise formed by corrugations $f$ and serrations $e$, will be correspondingly tenoned to fit therein, and their lower ends will be split and forced outward and inward into recesses formed at the base of flanges $d$ by means of a wedge or wedges, $i$, which will be forcibly driven up into the spoke when it is forced home into the hub. By this means the spoke is rigidly held against endwise displacement, and its foot being stepped between corrugations $f$, and its lateral edges between serrations $e$, thus preventing vibration and axial rotation, a means of securing the spokes to the hub, independent of the restraint of the fellies and tire, of unexceptional excellence is obtained.

With a view to strengthening flanges $d$, tie-rods $j$, of suitable strength, are passed through registering perforations in its serrations $e$, between the tenons of the spokes, and they are clinched upon the outer surfaces of the said flanges, as shown in Fig. 1, thus uniting the peripheries of the said flanges, the one with the other, and greatly increasing their powers of resistance to strain.

What I claim as new, and desire to secure by Letters Patent, is—

The hub C, provided with angular corrugations $ff$, in combination with the flanges $d\,d$, having radial ribs lying directly opposite each other, and in line with the corrugations $f$ and stay-rods $j$, substantially as described, and for the purpose set forth.

In testimony that I claim the above I have hereunto subscribed my name in the presence of two witnesses.

JOHN CLARK WANDS.

Witnesses:
C. W. NANCE,
MAURICE RIORDAN.